United States Patent Office 3,183,925
Patented May 18, 1965

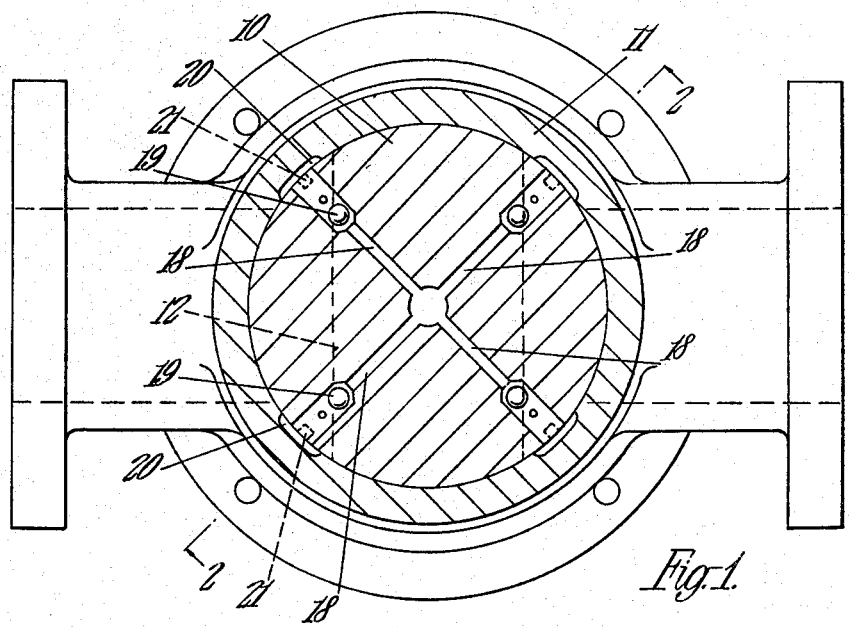
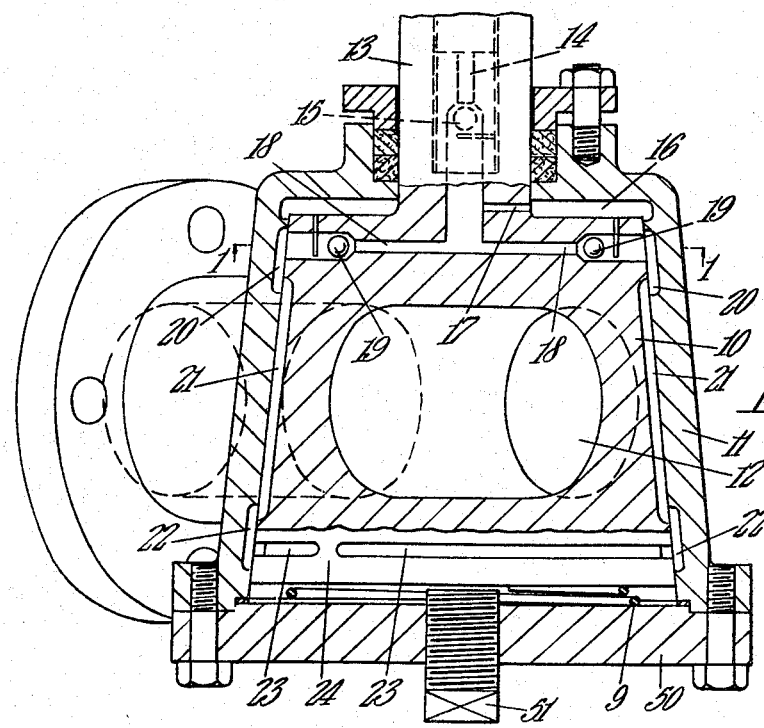
Fig. 1.
Fig. 2.

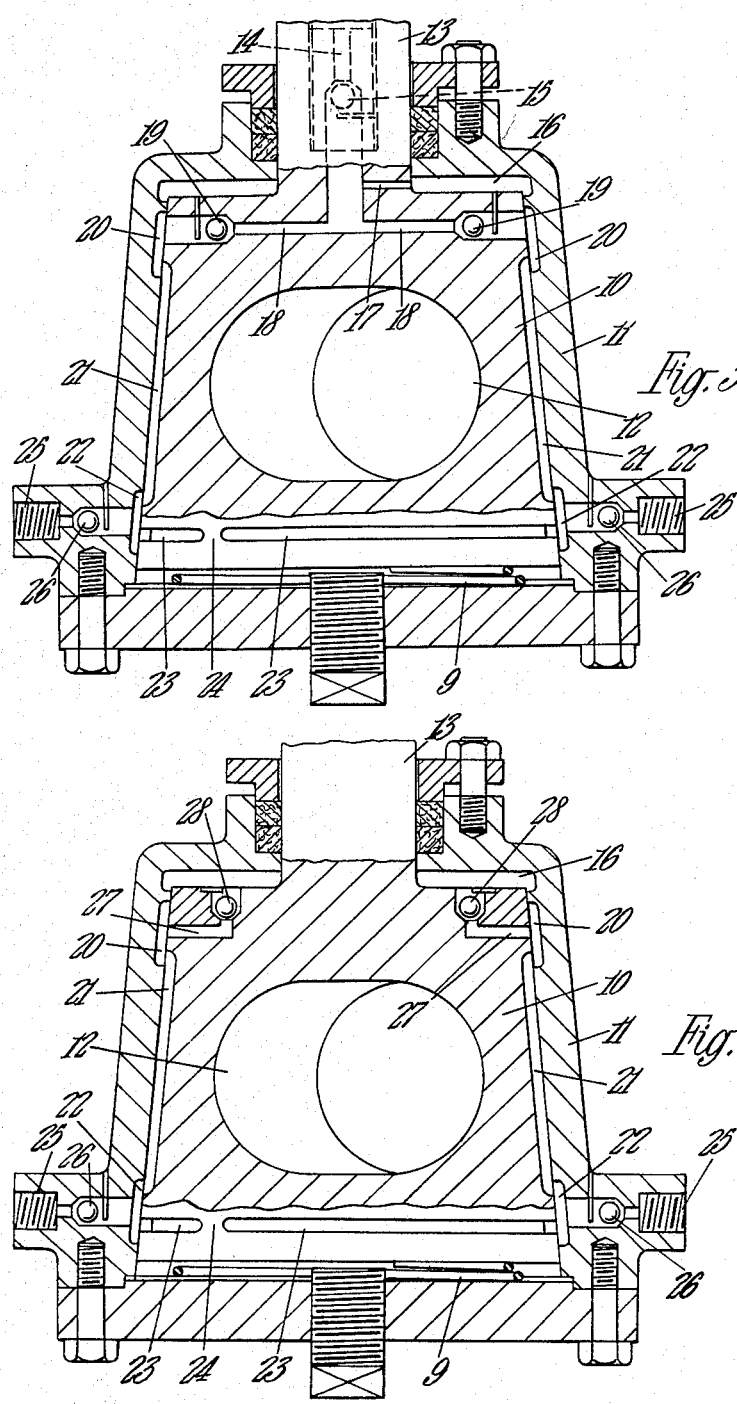

3,183,925
PLUG VALVE HAVING A PARTICULAR LUBRI-
CANT SEALANT ARRANGEMENT
Edgar Hoyle, Newport, and Terence John Floyd, Welling-
ton, England, assignors to Audco Limited, Newport,
England
Filed May 14, 1963, Ser. No. 280,294
3 Claims. (Cl. 137—246.14)

This invention relates to fluid-controlling valves of the kind incorporating a hollow body and a tapered closure member which is mounted in a seating in the body so as to be angularly movable between a closed position in which flow of fluid through ports formed in the valve body is prevented and an open position in which such fluid flow is permitted via an aperture formed in the closure member.

With such valves, difficulty may be experienced in turning the closure member owing to friction between the closure member and its seating in the valve body and one object of the present invention is to provide a fluid-controlling valve of the kind specified having new or improved means for lubricating the inter-engaging surfaces of the closure member and its seating to facilitate turning of said closure member.

It is one object of the present invention to provide a new or improved form of valve of the kind in which this disadvantage is overcome.

In accordance with the invention a valve of the kind specified is provided with means for feeding lubricant from the exterior of the valve to a chamber which is arranged so that the presence of pressurized lubricant therein will urge the closure member in a direction towards the larger end of its seating, and means for feeding lubricant to parts of the inter-engaging surfaces of the closure member and said seating which, in use and when the closure member is in its closed position, lie on the downstream side of said closure member.

The invention will now be more particularly described with reference to the accompanying drawings wherein:

FIGURE 1 is a sectional plan view (on the line 1—1 of FIGURE 2);

FIGURE 2 is a part-sectional elevation (on the line 2—2 of FIGURE 1) of one example of a valve formed in accordance with the invention;

FIGURES 3, 4, 5 are part sectional elevations similar to FIGURE 2 but showing alternative embodiments of the invention;

Figure 5:
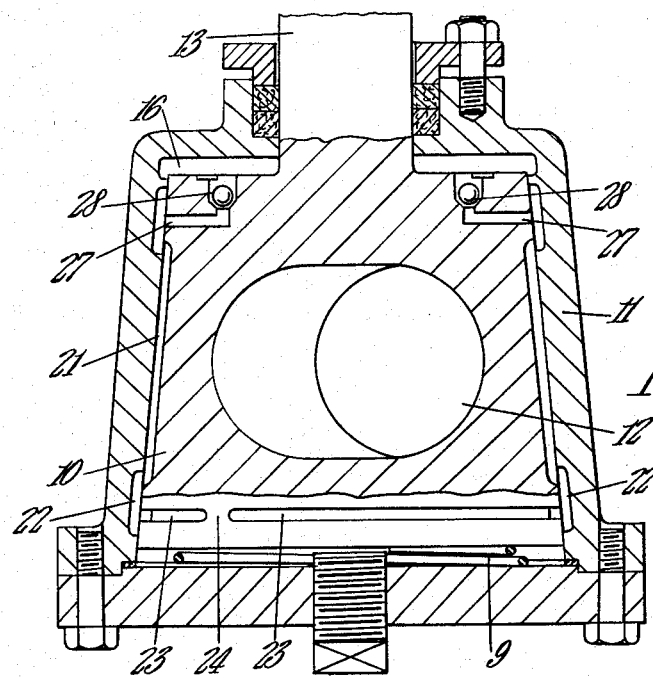

In the example shown in FIGURES 1 and 2 there is provided a fluid controlling valve having a tapered closure member 10 which is mounted in a seating formed by a bore of corresponding configuration in a hollow valve body 11. Said closure member is urged towards the smaller end of said bore by resilient means 9 and is angularly movable in the bore between an open position in which an aperture 12 formed in the closure member permits flow of fluid through ports formed in said valve body and a closed position in which such flow is prevented.

The closure member 10 is connected at its smaller end to an operating stem 13 which extends through the valve body and by means of which the closure member can be turned and said stem is provided with an insert in which is formed a passage 14 having a non-return valve 15 through which lubricant can be pumped from the exterior of the valve body when it is desired to lubricate parts of the inter-engaging surfaces of the closure member 10 and its seating in order to facilitate turning of said closure member. There is also provided at the smaller end of the closure member a jacking chamber 16 into which lubricant can be pumped from a passage 17 communicating with said passage 14 in the operating stem in order that the closure member can be eased towards the larger end of its seating so as again to facilitate turning of the closure member.

The aforesaid passage 14 in the stem of the valve is connected at its inner end to a plurality of passages 18 formed in the closure member, each of said passages having a non-return valve 19 and being arranged, when the closure member is in its closed position, to communicate with a recess 20 formed in the surface of the seating in the valve body. Thus, in the embodiment shown, two passages 18 extend to one side of the closure member and two passages 18 extend to the other side thereof. It is however within the scope of the invention to provide two passages 18 only which extend respectively to opposite sides of the closure member.

Each recess 20 is also in communication when the closure member is in its closed position with the upper end of a groove 21 formed on the surface of the closure member, the lower ends of said grooves 21 then communicating with further recesses 22 formed in the surface of the closure member seating, said recesses 22 themselves communicating with a pair of substantially semi-circular grooves 23 formed in the closure member and separated at diametrically opposite positions by lands 24.

Thus when (as will be the case while the closure member is in its closed position) said lands 24 are not aligned with a pair of diametrically opposite recesses 22, lubricant cannot pass from one semi-circular groove 23 to the other and the inter-engaging surfaces of the closure member and its seating will be provided with two separate regions to which lubricant can be supplied. In fact, when lubricant is supplied via passage 14 with the closure member in the closed position, only one of said regions will be lubricated, namely that region which is on the downstream side of the closure member, since in practice on the upstream side of said closure member fluid which the valve is controlling will seep between the closure member and the valve body and will act on those non-return valves 19 on the upstream side of the closure member to prevent lubricant from passing to said upstream side of the closure member.

Thus, if in use it is found that it is difficult to move the closure member from its closed position to its open position, lubricant will be pumped into the passage 14. Some lubricant will thus be forced into the jacking chamber 16 via passage 17 to ease the closure member slightly from its seating against the force exerted by spring 9 while at the same time some lubricant will also pass via the appropriate passages 18, non-return valves 19 and recesses 20 to that region of the inter-engaging surface of the closure member and valve body on the downstream side of the valve.

In the embodiment shown in FIGURE 3, the above-described arrangements for supplying lubricant to the jacking chamber 16 and to the inter-engaging surface of the closure member and seating are similarly provided but in this case two additional connections or nipples 25 are also provided for delivering lubricant via non-return valves 26 to the recesses 22 and thence to the grooves 21. The two connections 25 are disposed respectively on the upstream and downstream sides of the closure member so that each connection 25 is in direct communication (via a non-return valve 26) with one recess 22. The two recesses 22 on each side (i.e. the upstream side or the downstream side) of the closure member will however be interconnected with each other by a groove 23 when the closure member is in the closed position. Thus lubricant can be fed via a connection 25 either to the upstream or downstream side of the closure member as may be desired, the non-return valves 19 preventing any such lubricant from flowing into the jacking chamber 16.

In the embodiment shown in FIGURE 4, the previously described passage 14 in the stem of the closure member is omitted but two connections or nipples 25 are provided as in the case of FIGURE 3, and lubricant can be pumped from either of said connections 25 (preferably that connection lying on the downstream side of the closure member) into the associated recess 22, the interconnected recess 22 and associated grooves 21 on the same side of the closure member as the connection 25 to which lubricant is supplied. From the upper ends of said grooves 21, lubricant will flow via one pair of recesses 20 into the associated pair of passages 27 which communicate with the recesses 20, and thence past the non-return valves 28 into the jacking chamber 16. Lubricant cannot, however, flow from said jacking chamber to the other side of the closure member by reason of the non-return valves 28 associated with these passages 27 which communicate with said other side of the closure member.

Figure 6:
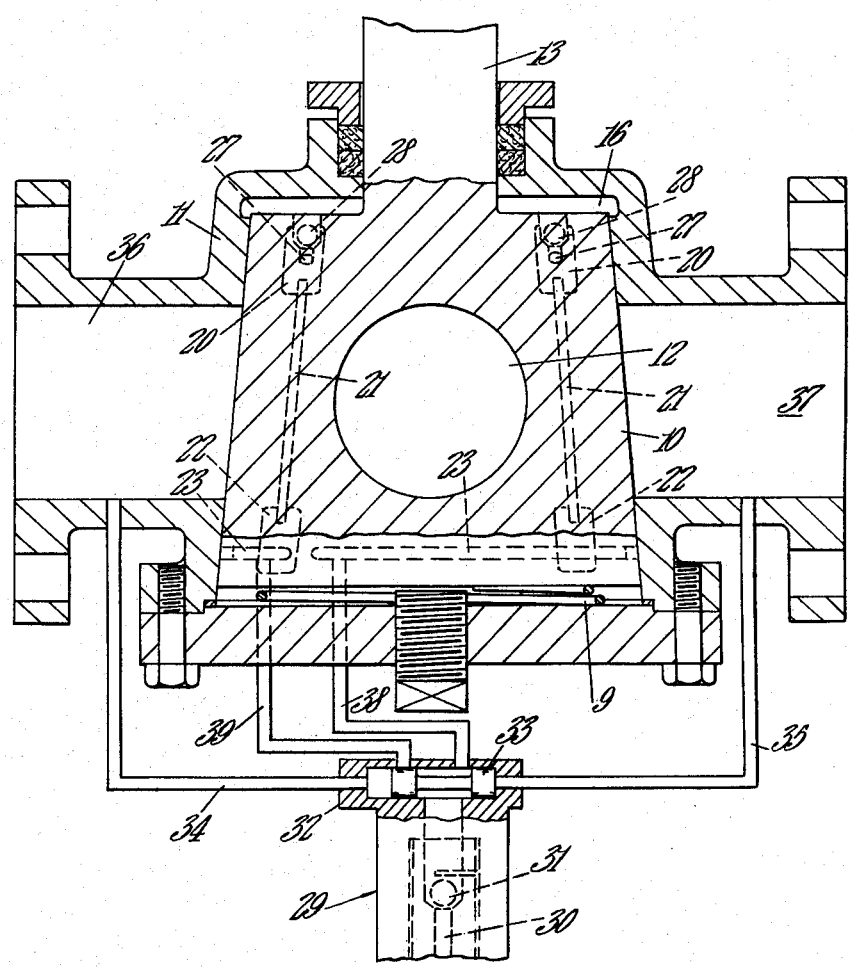
FIGURE 6 is a further sectional view of the embodiment shown in FIGURE 5, the section being taken in a plane which includes the axes of the ports in the hollow valve body.

Referring now to the embodiment shown in FIGURES 5 and 6, there is provided a device 29 having an insert which is formed with a passage 30 having a non-return valve 31, said device having also a control valve 32 in which is mounted a spool 33, opposite ends of the control valve being connected by lines 34 and 35 respectively to the ports 36 and 37 of the valve body. Thus, assuming that the closure member is in its closed position and that in use port 36 is on the upstream side of the valve, then the fluid pressure at port 36 will be higher than the fluid pressure at port 37 and the spool 33 of the control valve will be displaced to the right onto a seating as shown to close the line 35. Lubricant pumped into said device 29 via passage 30 and non-return valve 31 will thus flow via passage 38 to one of the semi-circular grooves 23 which itself communicates with that region of the inter-engaging surfaces of the closure member and seating on the downstream side of the closure member. Conversely, if the spool 33 is displaced to the left (consequent upon port 37 being on the upstream side of the valve) lubricant can flow via the control valve 32 into a passage 39 and thence to the other semi-circular groove 23. Thus, one or the other of the grooves 23 can be supplied with lubricant and from this groove lubricant can flow into the associated pair of recesses 22 and thence into the grooves 21 on the downstream side of the closure member. From the upper ends of the grooves 21 lubricant can flow via the appropriate pair of recesses 20 into the two communicating passages 27 and thence via the non-return valve 28 into the jacking chamber 16.

Figure 7:
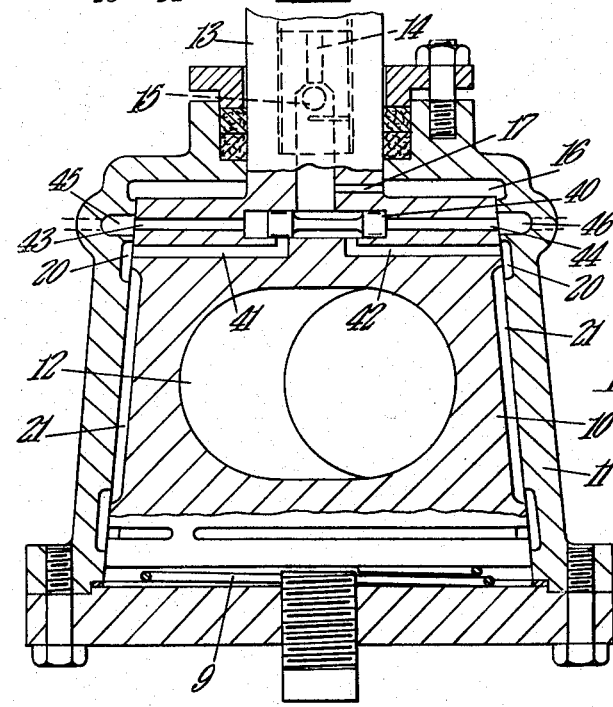
FIGURE 7 is a part-sectional elevation similar to FIGURE 2 but showing yet a further alternative embodiment of the invention.

In the embodiment shown in FIGURE 7, the external control valve 32 is omitted and a control valve is now mounted internally in the closure member. Thus as shown in FIGURE 7, a spool 40 is mounted in a cavity in the closure member, said spool serving to control the entry of lubricant to pairs of passages 41 and 42. The pair of passages 41 lead to one pair of recesses 20 and grooves 21 on one side of the closure member whereas the pair of passages 42 lead to the other pair of recesses 20 and grooves 21 on the other side of the closure member. Lubricant is supplied in this case via a passage 14 formed in a stem insert (a communicating passage 17 serving to pass lubricant to the jacking chamber 16) whilst the position of the spool 40 is controlled by the fluid pressure applied to the valve via passages 43 and 44 which are respectively aligned with passages 45 and 46 leading to the valve ports when the closure member is in the closed position. Thus as shown in FIGURE 7, it is assumed that passage 45 is connected to the port which is on the upstream side of the valve. High pressure fluid will thus be applied via passages 45 and 43 to the left hand end of the spool 40 as shown, thereby displacing said spool to the right so that lubricant can flow from passage 14 to the passage 42 and thence via recesses 20 to the grooves 21 on the downstream side of the closure member.

Having thus described our invention what we claim as new and desire to secure by Letters Patent is:

1. A fluid-controlling valve incorporating a hollow body and a tapered closure member which is mounted in a seating in the body so as to be angularly movable between a closed position in which flow of fluid through ports formed in the valve body is prevented and an open position in which such fluid flow is permitted via an aperture formed in the closure member wherein there is provided a chamber disposed adjacent to the smaller end of the closure member for receiving pressurized lubricant to urge said closure member towards the large end of its seating, means for feeding lubricant from the exterior of the valve to said chamber, second means for feeding lubricant to two regions of the inter-engaging surfaces of the closure member and its seating, said regions being disposed respectively on opposite sides of the closure member axis and being in communication with each other when the closure member is in an open position, the closure member being arranged to be biased by upstream pressure to engage its surface with the surface of the body so as to isolate said regions from each other when the closure member is in a closed position, and means responsive to upstream pressure for preventing lubricant from flowing from said second feeding means to that region of the inter-engaging surfaces of the closure member and its seating which, when the closure member is in its closed position, is disposed upstream of the closure member axis.

2. A fluid-controlling valve incorporating a hollow body and a tapered closure member which is mounted in a seating in the body so as to be angularly movable between a closed position in which flow of fluid through ports formed in the valve body is prevented and an open position in which such fluid flow is permitted via an aperture formed in the closure member wherein there is provided a chamber disposed adjacent to the smaller end of the closure member for receiving pressurised lubricant to urge said closure member towards the large end of its seating, means for feeding lubricant from the exterior of the valve to said chamber, second means for feeding lubricant to two regions of the inter-engaging surfaces of the closure member and its seating, said regions being disposed respectively on opposite sides of the closure member axis and each region incorporating a part annular groove formed on one of said inter-engaging surfaces, the two grooves thus formed being separated by lands which are bridged by recesses formed in the other of said surfaces when the closure member is in the open position, the closure member being arranged to be biased by upstream pressure to engage its surface with the surface of the body so as to isolate said regions from each other when the closure member is in a closed position, and means responsive to upstream pressure for preventing lubricant from flowing from said second feeding means to that region of the inter-engaging surfaces of the closure member and its seating which, when the closure member is in its closed position, is disposed upstream of the closure member axis.

3. A fluid-controlling valve incorporating a hollow body and a tapered closure member which is mounted in a seating in the body so as to be angularly movable between a closed position in which flow of fluid through ports formed in the valve body is prevented and an open position in which such fluid flow is permitted via an aperture formed in the closure member wherein there is provided a chamber disposed adjacent to the smaller end of the closure member for receiving pressurised lubricant to urge said closure member towards the large end of its seating, means for feeding lubricant from the exterior of the valve to said chamber, second means for feeding lubricant to two regions of the inter-engaging surfaces of the closure member and its seating, said regions being disposed respectively on opposite sides of the closure member axis and each region incorporating a part annular groove formed on one of said inter-engaging surfaces, the two grooves thus formed being separated by lands which are bridged by recesses formed in the other of said surfaces when the closure member is in the open position, the closure member being arranged to be biased by upstream pressure to engage its surface with the surface of the body so as to isolate said regions from each other when the closure member is in a closed position, and a valve connected to said regions and to said second feeding means comprising a spool mounted in a chamber which is connected at its two opposite ends to the upstream and downstream sides of the valve whereby said spool will in use be urged by the upstream pressure when the closure member is in its closed position to a position in which lubricant cannot flow from said second feeding means to the region which is disposed upstream of the closure member axis.

References Cited by the Examiner
UNITED STATES PATENTS

| | | | |
|---|---|---|---|
| 2,021,358 | 11/35 | Greenwood | 137—246.11 |
| 2,591,031 | 4/52 | Volpin et al. | 137—246.11 |
| 2,872,937 | 2/59 | Housworth | 137—246.13 XR |
| 2,986,156 | 5/61 | Volpin | 137—246.12 |
| 3,115,151 | 12/63 | Manor et al. | 137—246.19 |

FOREIGN PATENTS 781,948  5/35  France.

ISADOR WEIL, *Primary Examiner.*